(12) United States Patent
Vuckovic

(10) Patent No.: US 8,926,026 B2
(45) Date of Patent: Jan. 6, 2015

(54) ELECTRICALLY ACTUATABLE PARKING BRAKE SYSTEM

(71) Applicant: KNOOR-BREMSE Systeme fuer Nutzfahrzeuge GmbH, Munich (DE)

(72) Inventor: Zoran Vuckovic, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/622,131

(22) Filed: Sep. 18, 2012

(65) Prior Publication Data

US 2013/0015024 A1 Jan. 17, 2013

Related U.S. Application Data

(63) Continuation of application No. PCT/EP2011/053945, filed on Mar. 16, 2011.

(30) Foreign Application Priority Data

Mar. 19, 2010 (DE) .......................... 10 2010 011 978

(51) Int. Cl.
*B60T 13/74* (2006.01)
*B60T 13/68* (2006.01)
*B60T 13/38* (2006.01)
*B60T 15/36* (2006.01)

(52) U.S. Cl.
CPC ............. *B60T 13/686* (2013.01); *B60T 13/385* (2013.01); *B60T 15/36* (2013.01)
USPC ....................... 303/3; 303/15; 303/7; 303/123

(58) Field of Classification Search
USPC ................ 303/7, 15, 9, 123, 13, 127, 89, 2, 3
See application file for complete search history.

(56) References Cited

U.S. PATENT DOCUMENTS

| | | | | |
|---|---|---|---|---|
| 4,223,953 | A * | 9/1980 | Cruse | 303/2 |
| 6,270,168 | B1 * | 8/2001 | McCann | 303/77 |
| 7,832,813 | B2 | 11/2010 | Bensch et al. | |
| 2010/0025141 | A1 | 2/2010 | Bensch et al. | |
| 2010/0078988 | A1 * | 4/2010 | Bensch et al. | 303/3 |

FOREIGN PATENT DOCUMENTS

| | | |
|---|---|---|
| CN | 101312864 A | 11/2008 |
| CN | 101600611 A | 12/2009 |
| CN | 101622164 A | 1/2010 |
| DE | 102 35 707 A1 | 4/2004 |

(Continued)

OTHER PUBLICATIONS

International Search Report dated Aug. 16, 2011 with English translation (four (4) pages).

(Continued)

*Primary Examiner* — Melanie Torres Williams
(74) *Attorney, Agent, or Firm* — Crowell & Moring LLP

(57) ABSTRACT

An electrically actuatable parking brake system for a pneumatic braking system includes a control valve device that has a control piston. The parking brake system can assume at least two operating states, namely a parked state or a driving state. The operating states can be assumed in a selective manner dependent on a position of the control piston, and the parked state is provided when the control piston is forced into an end position by the force of a spring that lies in a spring chamber. Leaked air that exits a ventilating connection of the control valve device can be returned into the spring chamber.

8 Claims, 6 Drawing Sheets

(56) References Cited

FOREIGN PATENT DOCUMENTS

| | | |
|---|---|---|
| DE | 10 2005 058 799 A1 | 6/2007 |
| DE | 10 2007 061 908 A1 | 6/2009 |
| DE | 10 2008 007 877 B3 | 11/2009 |
| EP | 1 386 810 B1 | 5/2005 |
| EP | 2 238 004 B1 | 9/2011 |

OTHER PUBLICATIONS

German Office Action dated Jul. 12, 2010 with English translation (six (6) pages).
International Preliminary Report on Patentability (PCT/IB/338 & PCT/IB/373), including Written Opinion (PCT/ISA/237) dated Oct. 4, 2012 (six (6) pages).

* cited by examiner

ELECTRICALLY ACTUATABLE PARKING BRAKE SYSTEM

CROSS-REFERENCE TO RELATED APPLICATIONS

This application is a continuation of PCT International Application No. PCT/EP2011/053945, filed Mar. 16, 2011, which claims priority under 35 U.S.C. §119 from German Patent Application No. DE 10 2010 011 978.4, filed Mar. 19, 2010, the entire disclosures of which are herein expressly incorporated by reference.

BACKGROUND AND SUMMARY OF THE INVENTION

The invention relates to an electrically actuatable parking brake system for a pneumatic brake system, having a control valve device which has a control piston, it being possible for the parking brake system to engage at least two operating states, namely a parking state or a driving state, it also being possible for the operating states to be engaged selectively depending on a position of the control piston, and the parking state being present if the control piston is forced into an end position by the force of a spring which is arranged in a spring chamber (space).

The present disclosure is concerned with electrically actuatable parking brake systems as are described, for example, in DE 10 2008 007 877 B3. A central safety-relevant requirement made of systems of this type consists in the fact that a power failure must not lead to a change in the state of the parking brakes; if the parking brake is in its parking state, the parking state has to be maintained even in the case of a power failure, in order to thus prevent the commercial vehicle in every case from rolling away unintentionally; if the parking brake is in a driving state, the parking brake must not be engaged suddenly in the case of a power failure, since this can lead to dangerous situations during driving.

In order to meet these safety-relevant requirements, bistable control valves can be used. The latter can be electrically or pneumatically actuatable. The present invention is concerned with pneumatically actuatable switching valve devices which are incorporated into an electrically actuatable parking brake system such that there is bistability and, therefore, the above-mentioned safety-relevant requirements are met.

Electrically actuatable parking brake systems and, in particular, the pneumatic control valve devices which are mentioned are to be designed such that absolute switching security is ensured. If the pressure conditions in the parking brake system are therefore changed over, in order to bring about a switchover of the control valve device, the control valve device has to be capable of switching reliably, in the case of any external circumstances, in particular even at low temperatures which can impede a switchover of the switching valve device, in particular on account of increased frictional forces.

The invention is based on the object of providing a concept, in which the bistability of a pneumatic control valve device is ensured for an electrically actuatable parking brake system; this is intended to ensure a stable parking state, in particular.

This and other objects are achieved by an electrically actuatable parking brake system for a pneumatic brake system, having a control valve device which has a control piston. It is possible for the parking brake system to engage at least two operating states, namely a parking state or a driving state. It is also possible for the operating states to be engaged selectively depending on a position of the control piston, wherein the parking state is present if the control piston is forced into an end position by the force of a spring which is arranged in a spring chamber. Leakage air, which escapes out of a ventilation connection of the control valve device, is returnable into the spring chamber.

The invention improves upon the generic prior art mentioned at the outset, by virtue of the fact that leakage air which escapes out of a ventilation connection of the control valve device can be returned into the spring chamber. The leakage air which can be returned into the spring chamber can assist the action of the spring, that is to say contribute to its force, by way of which the piston is forced into a position which ensures the parking state.

It can be provided, in particular, that, in addition to the ventilation connection, the control valve device has a first working connection, a second working connection and a pneumatic control input. The control valve device engages the driving state by way of ventilation of the control input, in which driving state the working connections are connected to one another, and in which driving state the second working connection is sealed with respect to the ventilation connection. The control valve device engages a parking state by way of ventilation of the control input and spring force, in which parking state the working connections are sealed with respect to one another and the second working connection is connected to the ventilation connection. In the parking state, the second working connection and the components which are connected downstream of it are to be connected to the ventilation connection, with the result that the system is pressureless. Here, the first working connection which is connected to the compressed air source is to be sealed, in particular, therefore, it is not to be connected to the ventilation connection. Nevertheless, a certain amount of leakage is not ruled out, with the result that leakage air can be guided to the ventilation connection. This leakage air is then fed to the spring chamber in order to assist the maintenance of the parking state.

In this context, it is particularly useful that the second working connection can be coupled to a compressed air consumer, that the pneumatic control input is coupled at least indirectly to the control input of a relay valve for the parking brake, that the ventilation connection is coupled to a control and ventilation valve device, and that a ventilation output of the control and ventilation valve device is coupled to the spring chamber. The control and ventilation valve device, which is preferably designed as a solenoid valve, supplies the pneumatic signals for the control valve device. In particular, it also provides a ventilation output, via which the system pressure of the parking brake system can be dissipated, whereby at the same time a control signal is provided for the control valve device. The leakage air which escapes via the ventilation connection of the control and ventilation valve device can then be utilized, in order to be fed to the spring space of the control valve device.

The invention is developed in a particularly advantageous manner by virtue of the fact that the ventilation output of the control and ventilation valve device is coupled to a component which generates a throttling or accumulating effect, and a leakage air return line which leads to the spring chamber branches off between the ventilation output and the component. The component which generates the throttling or accumulating effect ensures that the leakage air does not simply flow out to atmosphere, but rather can be recirculated, in order to assist the spring action in the spring chamber of the control and valve device.

Here, it can be provided, in particular, that the component which generates the throttling or accumulating effect is a non-return valve.

It is then particularly useful that the opening and closing pressures of the non-return valve are selected in such a way that the non-return valve opens at a first pressure level below a system pressure, in order to permit ventilation of the parking brake system, and closes at least partially at a second pressure level below the first pressure level, in order to generate a throttling or accumulating effect. The non-return valve therefore does not impede, or only impedes to a noncritical extent, the ventilation of the system during the transition from the driving state into the parking state. Nevertheless, the throttling or accumulating effect of the non-return valve is sufficient to at least partially prevent the leakage air from flowing out to atmosphere in the parking state and to build up a pressure in the spring chamber of the control valve device.

In this context, it can be particularly useful that the opening and/or closing pressure of the non-return valve can be adjusted. This can be advantageous, since the leakage rate of the control valve device changes during the system service life, in particular can increase. An adaptation can be carried out here by changing of the switching pressures of the non-return valve, in particular in the context of maintenance, in order to ensure reliable functioning of the system in a lasting manner.

In conjunction with the present invention, the utilization of the leakage air to ensure the parking state has been described; it has been assumed in the preceding text that the leakage, via which the leakage air flows out, is an undesirable property of the control valve device. However, it can even be provided that the control valve device is equipped with a leak in a targeted manner, in order thus to make a defined contribution to the force which ensures the parking state.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the circuit diagrams and the sectional views of valve devices, identical designations denote equal or comparable components. As central devices, the circuits utilizes 3/2-way valves. The latter can be replaced in each case by two 2/2-way valves; the principles which are explained using the 3/2-way valves can then be transferred in the context of the present invention to the 2/2-way valve groups.

Figure 1:
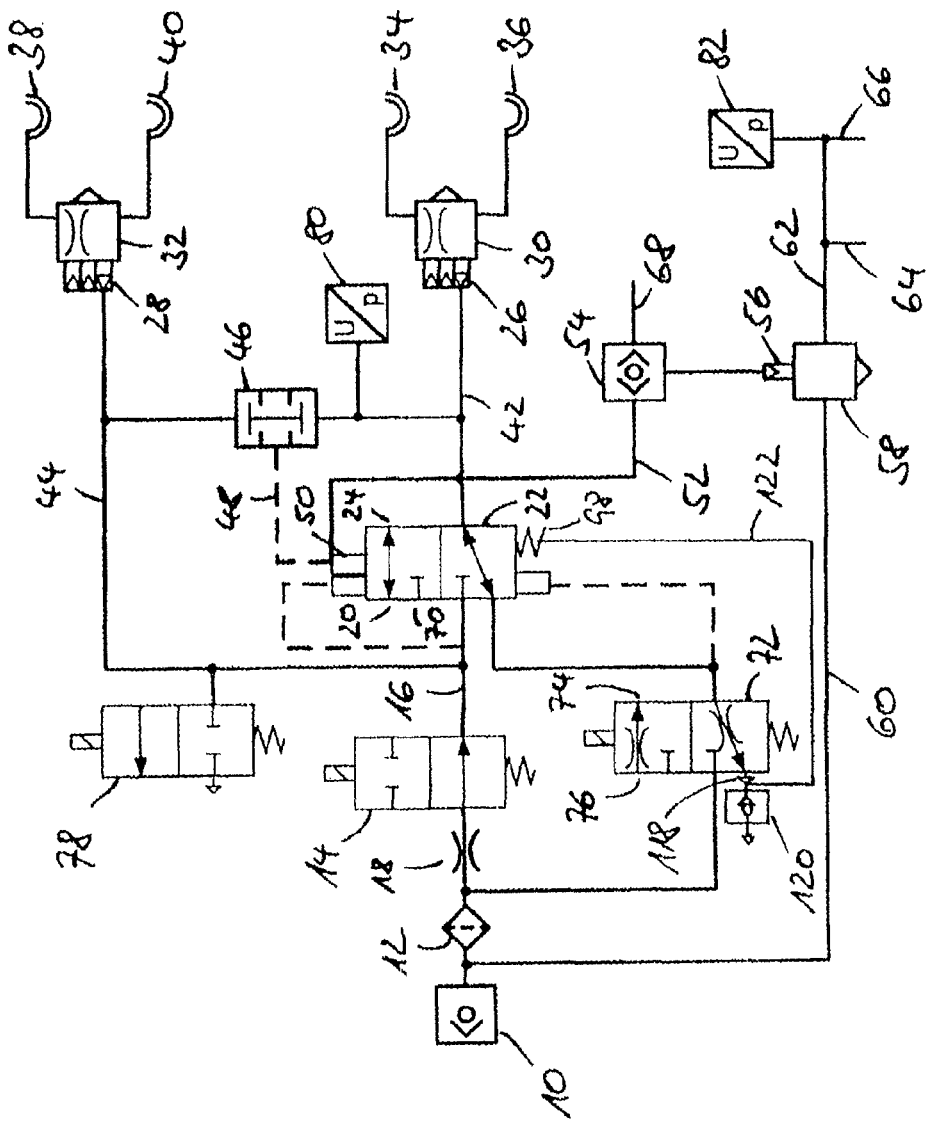
FIG. 1 is a circuit diagram of an electrically actuatable parking brake system.

FIG. 1 shows a circuit diagram of an electrically actuatable parking brake system. The electrically actuatable parking brake system is connected via a non-return valve 10 to a compressed air preparation system (not shown). The non-return valve 10 is followed by an optional screen or an optional filter unit 12, via which compressed air is fed to a supply solenoid valve 14 which is configured as a 2/2-way valve, with an optional throttle 18 being connected in between. The throttle 18 ensures that the effect of input-side leaks is limited.

A working connection 20 of a control valve device 22 is connected via a supply line section 16 to the output of the supply solenoid valve 14. The control valve device 22 is configured as a pneumatically actuatable 3/2-way valve. A second working connection 24 of the control valve device 22 leads to a control input 26 of a trailer control module 30. The latter operates a supply connection 34 and a control connection 36 of the trailer coupling. A control input 28 of a further trailer control module 32 is connected via a trailer control line branch 44 to the supply line branch 16. It has a supply connection 38 and a control connection 40.

The trailer control line branches 42, 44 are connected to inputs of a select low valve 46, the output of which is connected via a control line 48 to a control input 50 of the control valve device 22. The select low valve 46 operates in such a way that the lower input pressure, that is to say the lower pressure from the two trailer control line branches 42, 44, prevails at its output, that is to say in the control line 48.

Furthermore, the control line 48 is connected via a relay control line 52 and a shuttle valve 54 to the relay control input 56 of a relay valve 58. Via a relay supply line 60, the relay valve 58 obtains compressed air from a point upstream of the supply solenoid valve 14. A relay output line leads to line branches 64, 66, to which spring force accumulator cylinders (not shown) are connected. Furthermore, a service brake line 68 is connected to the shuttle valve 54.

One connection 74 of a control and ventilation valve device 72 is connected to a ventilation connection 70 of the control valve device 22. A further connection 76 of the control and ventilation valve device 72 is supplied with compressed air from a point between the filter unit 12 and the supply solenoid valve 14. Furthermore, a ventilation valve 78 is provided which is configured as a 2/2-way valve and is connected to the supply line section 16. Furthermore, pressure sensors 80, 82 are provided for detecting the pressures at the second working connection 24 of the control valve device 22 and the relay output line 62.

In the switching state which is shown in FIG. 1, the second working output of the control valve device 22 is ventilated via the control and ventilation valve device 72, with the result that, in the absence of pressure loading via the service brake line 68, the control input 56 of the relay valve 58 is also ventilated. As a result, the spring force accumulator cylinders (not shown) are pressureless, with the result that the parking brake is in its parking position.

The control and ventilation valve device 72 is then switched over in order to transfer the parking brake into a driving position. As a result, a pressure is built up, in particular, in the control line branch 48, the relay control line 52 and at the relay control input 56. If a threshold value is exceeded, this pressure leads to switching through of the relay valve 58, with the result that the spring force accumulator cylinders are loaded with pressure and the parking brake is released. The pressure in the control line 48 is likewise the driving force for switching over the control valve 22.

Depending on the switching strategy, this switchover can take place before the control and ventilation device 72 is transferred again into its currentless state which is shown. If the switchover is to take place while the control and ventilation valve device 72 is still in its current-applied state, the control valve device 22 is to be equipped with active surfaces of such a type that the pressures which prevail at the connections produce forces which overcome the spring force of the control valve device 22.

The switching strategy which permits switching over of the control valve device 22 counter to the spring force after a switchover of the control and ventilation valve device 72 into its currentless state is based on dynamic sequences which will be explained later. If it has therefore been achieved in any way that the control valve device 22 has switched over, the pressure can build up further at the control inputs 50 and 56 of the control valve device 22 and the relay valve 58, since the corresponding line branches are then supplied with compressed air from the supply line section 16. In particular, the control valve device 22 remains in its state in the absence of further switching operations of the solenoid valves 14, 72, 78. A power failure has no influence on this, with the result that no unintended transfer of the parking brake system into its parking state can take place. In contrast, a switchover of this type takes place according to plan by virtue of the fact that the ventilation solenoid valve 78 has current applied to it, with the result that the pressure decreases in the supply line section and therefore also at the control inputs 50, 56 of the control valve device 22 and the relay valve 56. This leads to a switchover of the control valve device 22 into its shown position and to subsequent complete ventilation of the control inputs 50, 56 of the control valve device 22 and the relay valve 58. The parking position which is engaged in this way is secured by the spring action in the control valve device 22, with the result that a power failure once again cannot lead to it being possible for a transfer from the parking state into the driving state unintentionally.

There is a further switching state of the system if the ventilation valve 78, the supply solenoid valve 14 and the control and ventilation valve device 72 have current applied to them, with the result that the control input 50 of the control valve device 22 and the control input 56 of the relay valve are ventilated, and in contrast the control input 26 of the trailer control valve 30 is activated. These pressure conditions in the system bring about a release of the trailer brake, whereas the parking brake of the traction engine is or remains engaged. There is therefore a trailer test state, in which a test can be carried out as to whether the entire vehicle composed of the traction engine and the trailer can be held solely by the parking brake of the traction engine.

A non-return valve 120 is arranged downstream of the ventilation output 118 of the control and ventilation valve device 72. A leakage air return line 122 branches off upstream of the non-return valve in the flow direction, which leakage air return line 122 conducts leakage air to the spring chamber (not shown in detail here) of the control valve device 22, in which spring chamber a spring 98 is arranged for ensuring the parking state. If a leakage then occurs in the shown switching state of the control valve device 22, that is to say, in particular, a passage of compressed air which is present at the first working connection 20 to the ventilation connection 70 of the control valve device 22 and therefore to the ventilation output 118 of the control and ventilation valve device 72, this leakage air can be returned via the leakage air return line 122 to the spring chamber of the control valve device 22. To this end, the opening pressure of the non-return valve 120 is selected, in particular, in such a way that the non-return valve 120 then does not open, or opens only a little, with the result that at least one throttling action for the leakage air is provided, since only so is it possible to build up an effective pressure in the spring chamber of the spring 98 of the control valve device 22. This avoids a situation where the relay valve 58 opens prematurely on account of an undesired pressure build-up in the relay control line 52 and therefore at the relay control input 56. This could otherwise be the case in characteristic curve profiles of the relay valve 58 which permit this, with the result that an undesirably high pressure might be built up at the output of the relay valve 58 and therefore in the spring force accumulator cylinders. In some circumstances, the braking action of the parking brake would therefore no longer be sufficient depending on loading and gradient.

Figure 2:
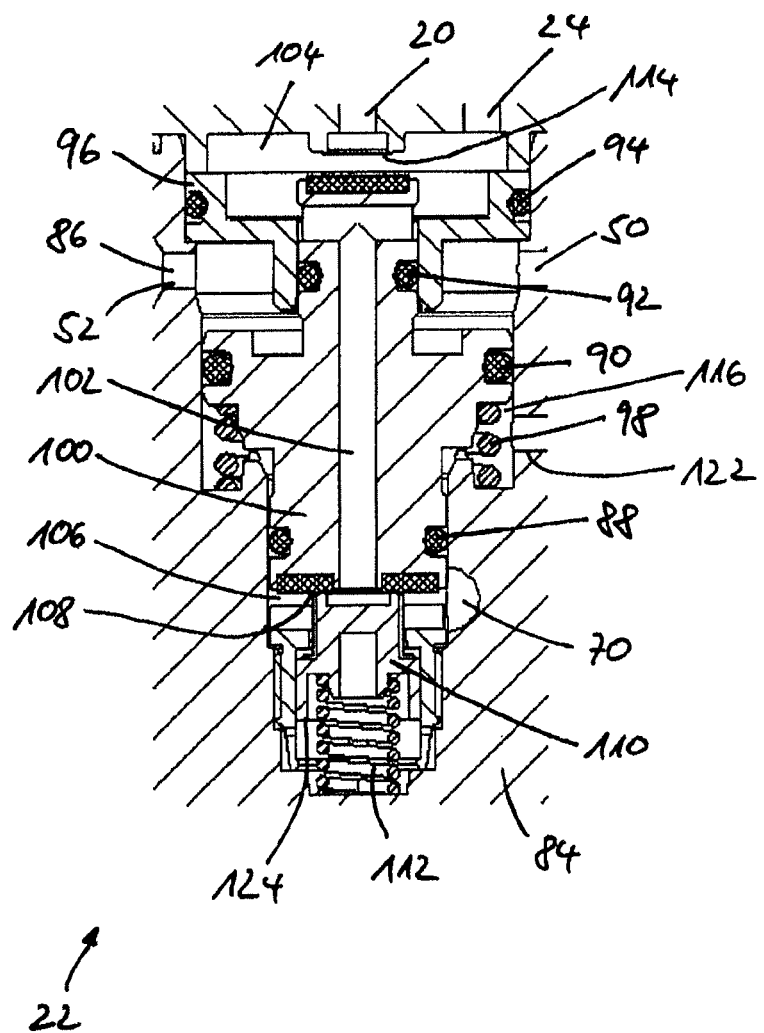
FIG. 2 is a sectional view of a control valve device having a displaceable valve seat in a driving position.

FIG. 2 shows a control valve device 22 having a displaceable valve seat 108 in a driving position. A valve housing 84 accommodates the control valve device 22 which has a first working connection 20, a second working connection 24, a control input 50 and a ventilation connection 70. Furthermore, a relay connection 86 is provided which is connected to the relay control line 52 and at which the same pressure prevails as at the control input 50. The control valve device 22 includes a control piston 100, which is guided via three O-rings 88, 90, 92, which act as radial seals, in the valve housing 84, or a collar 96 which is inserted in the valve housing 84 in a sealing manner via an O-ring 94. A spring 98 is provided which loads the control piston 100 with force. The control piston 100 has a central bore 102, via which a working space 104 can communicate with a ventilation space 106. In the shown state of the control valve device 22, however, this communication is suppressed by the first valve seat 108 which has a sealing action. The first valve seat 108 comes into action as a result of an interaction of the control piston 100 with a valve seat piston 110, the valve seat piston 110 being supported on the valve housing 84 via a spring 112.

The switching state, shown in FIG. 2, of the control valve device 22 is then present if compressed air is fed via the working connection 20 and the control input 50, whereas the ventilation connection 70 is ventilated.

Figure 3:
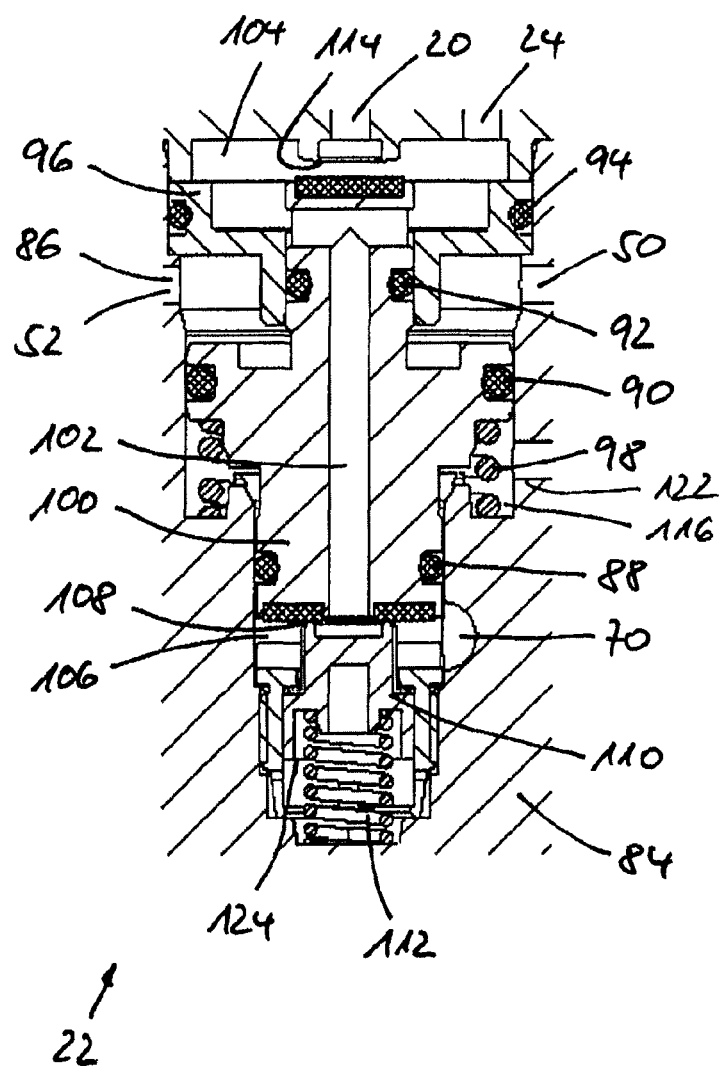
FIG. 3 is a sectional view of a control valve device having a displaceable valve seat in an intermediate position.
Figure 4:
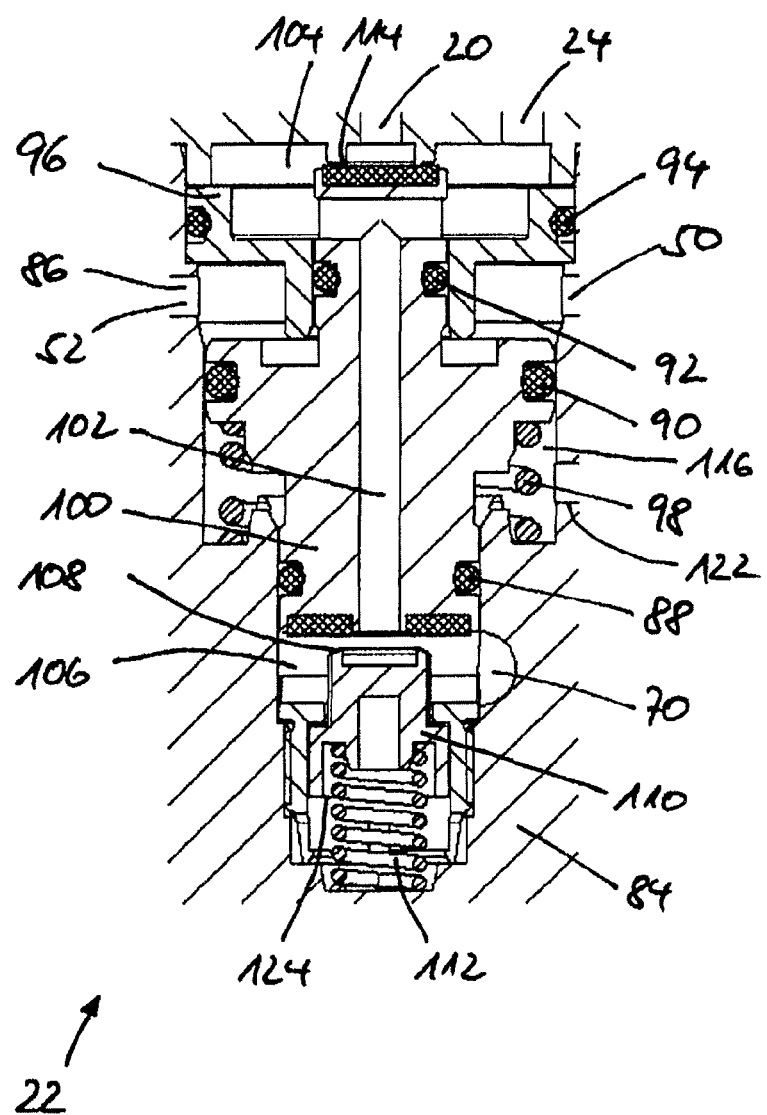
FIG. 4 is a sectional view of a control valve device having a displaceable valve seat in a parking position.

FIG. 3 shows the control valve device 22 having a displaceable valve seat 108 in an intermediate position. FIG. 4 shows the control valve device 22 having a displaceable valve seat 108 in a parking position. If the control valve device 22 is to be transferred from the switching state shown in FIG. 2, the driving state, into the switching state shown in FIG. 4, the parking state, the working connection 20 is ventilated. As a result, the springs 98, 112 can move the control piston 100 counter to the decreasing pressure in the working space. Here, the displaceable valve seat piston 110 follows the control piston 100. An intermediate state which is assumed as a result is shown in FIG. 3. The control piston 100 has already moved in a direction which reduces the working space 104, but the valve seat 108 still seals the working space 104 with respect to the ventilation space 106. As a result, possible adhesion of the control piston 100 on the valve seat 108 has not yet had to be overcome at this time. Merely the static friction force of the O-rings 88, 90, 92 has up to now acted counter to the movement of the control piston 100. Any possible adhesion forces of the valve seat 108 have to be overcome only during the subsequent transition to the switching state according to FIG. 4, while at the same time only the sliding friction of the O-rings 88, 90, 92 comes into action. The opening of the valve seat 108 is therefore freed from a counterforce brought about by the static friction of the radial seals. When the state in FIG. 4 is reached, the control piston 110 closes a second valve seat 114, as a result of which the working connections 20, 24 are disconnected from one another. As a result, no more compressed air passes to the working output 24, and also no more compressed air to the control input 50 in the case of external connection according to FIG. 1.

Whereas the initial movement of the control piston during the transition from the driving position according to FIG. 2 to the parking position according to FIG. 4 is assisted by the action of the spring 112, the spring 112 does not impede the initial movement of the control piston 100 during the transition from the parking position according to FIG. 4 to the driving position according to FIG. 2. By virtue of the fact that the ventilation connection 70 is loaded with pressure in the state according to FIG. 4, a pressure is also built up in the working space 104 and, in the case of external connection according to FIG. 1, at the control input 50 of the control valve device 22. The force of the spring 98 and the static friction of the O-rings 88, 90, 92 then have to be overcome, but not the force of the spring 112. The latter plays a role again only during the closure of the valve seat 108; then, however, only the sliding friction of the O-rings 88, 90, 92 counteracts the movement of the control piston 100, as a result of which the control valve device 22 can be transferred reliably into its driving position according to FIG. 2.

For the transition from the driving position according to FIG. 2 into the parking position according to FIG. 4, it is particularly useful if the initial movement of the control piston 100 is assisted by virtue of the fact that the ventilation output 70 is activated. In the circuit according to FIG. 1, this takes place by current application to the control and ventilation solenoid valve 72. If the valve seat piston 110 is then arranged in the valve housing 84 such that its surface 124, which faces away from the valve seat 108 and therefore faces the spring 112, is loaded by the pressure which is fed in via the ventilation connection 70, the force which is produced as a result usefully assists the movement of the control piston in the direction of the second valve seat 114.

The spring 98 which drives the control piston 100 of the control valve device 22 into the parking state, that is to say the state according to FIG. 4, is arranged in a spring chamber 116 which is adjoined by a leakage air return line 122. If compressed air is fed via this leakage air return line 122, this pressure, which is built up as a result, assists the action of the spring 98. The maintenance of the parking state becomes more reliable in this way.

Figure 5:
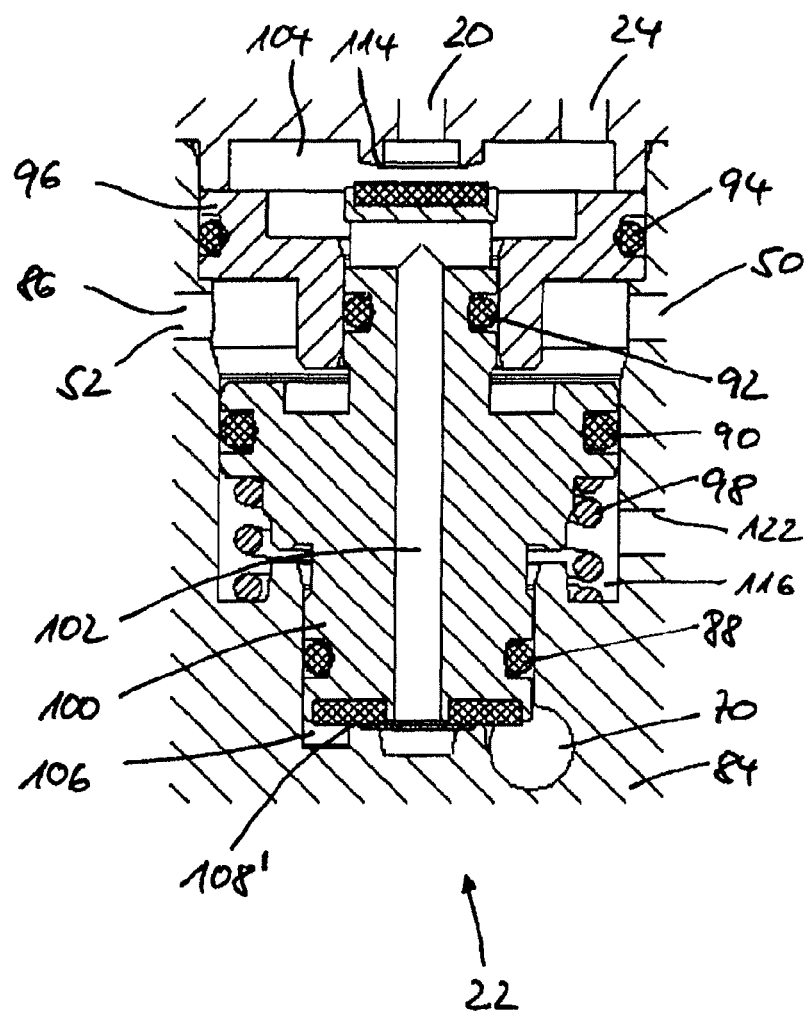
FIG. 5 is a sectional view of a control valve device having a fixed valve seat in a driving position.
Figure 6:
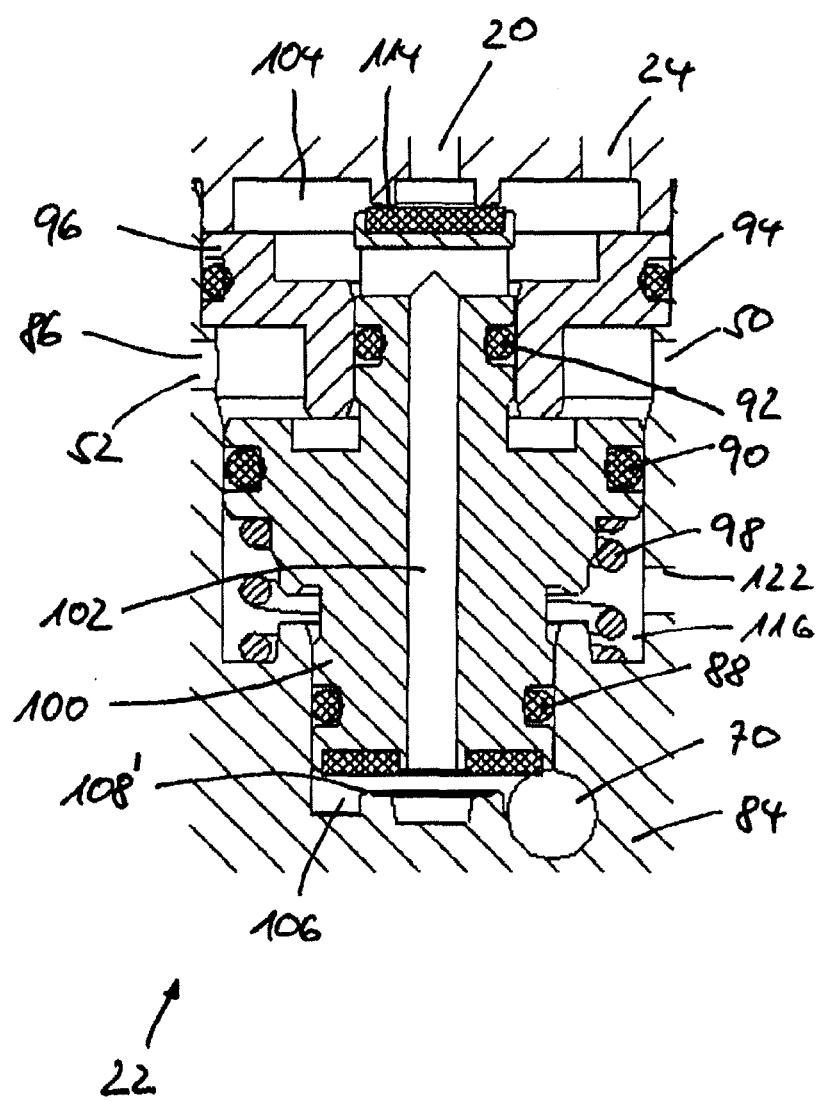
FIG. 6 is a sectional view of a control valve device having a fixed valve seat in a parking position.

FIG. 5 shows a control valve device 22 having a fixed valve seat 108' in a driving position. In contrast to the embodiment according to FIGS. 2 to 4, the control valve device 22 according to FIG. 5 does not have a displaceable valve seat piston. Rather, the valve seat 108' is fixed. Nevertheless, the transition from the driving position, which is shown in FIG. 5, to the parking position, which is shown in FIG. 6, can be assisted by the ventilation connection 70 being activated, while at the same time the working connection 20 is ventilated.

The control valve devices which are described in conjunction with FIGS. 2 to 6 are guided and sealed by three O-rings 88, 90, 92. The active faces of the control piston 100 are designed such that a transition from the parking position into the driving position takes place in the case of a current-applied control and ventilation solenoid valve device 72 according to FIG. 1. As soon as the control valve device 22 is then switched over into the driving position, the control and ventilation valve device 72 can be transferred into its currentless state without an effect for the switching state of the control valve device 22.

LIST OF DESIGNATIONS

10 Non-return valve
12 Filter unit
14 Supply solenoid valve
16 Supply line section
18 Throttle
20 First working connection
22 Control valve device
24 Second working connection
26 Control input
28 Control input
30 Trailer control module
32 Trailer control module
34 Supply connection
36 Control connection
38 Supply connection
40 Control connection
42 Trailer control line branch
44 Trailer control line branch
46 Select low valve
48 Control line
50 Control input
52 Relay control line
54 Shuttle valve
56 Relay control input
58 Relay valve
60 Relay supply line
62 Relay supply line
64 Line branch
66 Line branch
68 Service brake line
70 Ventilation connection
72 Control and ventilation valve device
74 Connection
76 Connection
78 Ventilation solenoid valve
80 Pressure sensor
82 Pressure sensor
84 Valve housing
86 Relay connection
88 O-ring
90 O-ring
92 O-ring
94 O-ring
96 Collar
98 Spring
100 Control piston
102 Bore
104 Working space
106 Ventilation space
108 First valve seat
108' First valve seat
110 Valve seat piston
112 Spring
114 Second valve seat
116 Spring space
118 Ventilation output
120 Non-return valve
122 Leakage air return line
124 Surface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An electrically actuatable parking brake system for a pneumatic brake system, comprising:
a control valve device having a control piston, a ventilation connection, and a spring, the spring being arranged in a spring chamber and applying a force to displace the control piston into an end position wherein:

the parking brake system is operatively configured to selectively engage at least a parking state and a drive state, the parking state occurs if the control piston is forced into the end position by the spring force of the spring arranged in the spring chamber, leakage air that escapes out of the ventilation connection of the control valve device is returnable into the spring chamber.

2. The electrically actuatable parking brake system according to claim 1, wherein:

the control valve device further comprises a first working connection, a second working connection, and a pneumatic control input;

the control valve device engages the driving state by way of ventilating the control input, in which driving state the first and second working connections are connected to one another, and the second working connection is sealed with respect to the ventilation connection; and the control valve device engages the parking state by ventilating the control input and spring force of the spring, in which parking state the first and second working connections are sealed with respect to one another, and the second working connection is connected to the ventilation connection.

3. The electrically actuatable parking brake system according to claim 2, wherein:

the second working connection is coupleable to a compressed air consumer;

the control input is coupled at least indirectly to a control input of a relay valve for the parking brake;

the ventilation connection is coupled to a control and ventilation valve device; and a ventilation output of the control and ventilation valve device is coupled to the spring chamber.

4. The electrically actuatable parking brake system according to claim 3, wherein the ventilation output of the control and ventilation valve device is coupled to a component that generates a throttling or accumulating effect, and wherein a leakage air return line is operatively configured to branch off between the ventilation output and the component and lead to the spring chamber.

5. The electrically actuatable parking brake system according to claim 4, wherein the component is a non-return valve.

6. The electrically actuatable parking brake system according to claim 5, wherein opening and closing pressures of the non-return valve are selected such that the non-return valve opens at a first pressure level below a system pressure in order to permit ventilation of the parking brake system, and closes at least partially at a second pressure level below the first pressure level in order to generate the throttling or accumulating effect.

7. The electrically actuatable parking brake system according to claim 6, wherein the opening and/or closing pressures of the non-return valve are adjustable.

8. A method of operating an electrically actuatable parking brake system for a pneumatic braking system, the method comprising the acts of:

selectively assuming one of at least two operating states of the parking brake system dependent on a position of a control piston of a control valve device, a parked state occurring when the control piston is forced into an end position via a spring force of a spring arranged in a spring chamber of the control valve device; and returning leaked air that exits a ventilating connection of the control valve device into the spring chamber of the control valve device in the parked state in order to assist maintaining of the parked state.

* * * * *